United States Patent Office 2,915,485
Patented Dec. 1, 1959

2,915,485

PROCESS FOR PREPARING FLEXIBLE RESINIFIED PRODUCTS FROM POLYEPOXIDES AND RESULTING PRODUCTS

Edward C. Shokal, Walnut Creek, Calif., assignor to Shell Development Company, New York, N.Y., a corporation of Delaware No Drawing. Application September 1, 1955
Serial No. 532,110

11 Claims. (Cl. 260—18)

This invention relates to polyepoxides, and more particularly to a new method for preparing resinified products from polyepoxides which have improved flexibility and impact resistance.

Specifically, the invention provides a new and practical method for preparing resinified products from polyepoxides which have excellent flexibility and impact resistance and retain these properties even after prolonged aging at elevated temperatures. This process comprises heating and reacting the polyepoxide, and particularly a glycidyl polyether of a polyhydric phenol, with certain specific proportions of an organic epoxy cross-linking agent having at least three active hydrogen and an organic compound having a single functional group reactive with epoxy groups and containing at least 12 atoms in a chain structure. The invention further provides improved resinified products prepared by this process.

Polyepoxides, such as, for example, those obtained by reacting epichlorohydrin with polyhydric phenols in the presence of sodium hydroxide, are promising materials for use in preparing industrial products as they may be cured to form resins which are very hard and durable and have good resistance to chemicals. These polyepoxides, however, have certain undesirable characteristics which have greatly limited their industrial application. These materials, for example, have rather limited flexibility and this prevents their use in applications, such as coatings for cellophane, house paints, etc., where some flexibility and distensibility are required. Some efforts have been made in the past to correct this defect by adding various reactants but the improvement obtained has not been all that has been desired. In most cases, the improvement in flexibility has been accomplished by loss of impact resistance, and in other cases the improvement in flexibility has been only temporary and after a short period of exposure the material again becomes brittle.

It is therefore an object of the invention to provide a new process for resinifying polyepoxides. It is a further object to provide a process for preparing resinified polyepoxides which have excellent flexibility as well as good impact resistance. It is a further object to provide a process for preparing resinified polyepoxides which have excellent flexibility and good impact resistance which are not lost on aging. It is a further object to provide a process for preparing resinified polyepoxides which may be used as flexible coatings for films, such as cellophane, and the like. It is a further object to provide resinified polyepoxides having many improved properties. Other objects and advantages of the invention will be apparent from the following detailed description thereof.

It has now been discovered that these and other objects of the invention may be accomplished by the process of the invention which comprises heating and reacting a polyepoxide, and particularly a glycidyl polyether of a polyhydric phenol, with an organic epoxy cross-linking agent having at least three active hydrogen and an organic compound having a single functional group reactive with epoxy groups and containing at least 12 atoms in a chain structure, the total amount of cross-linking agent and the organic compound containing the long chain of aliphatic carbon atoms being sufficient to furnish at least .9 equivalent for every epoxy equivalent and not more than 70% of the equivalent mixture being the cross-linking agent. It has been found that when the polyepoxides are heated and reacted with these particular components in these special proportions the resulting resinified products have surprisingly high flexibility and impact resistance and these properties are not lost on exposure to elevated temperatures. Thus, as shown in the working examples at the end of the specification, the high flexibility and impact resistance of the products are maintained even after 20 days of exposure at 65° C. Similar resins prepared without the use of these special reactants and conditions lose their flexibility after only a few days of exposure to these conditions. In addition, the resinified polyepoxides prepared as above possess excellent adhesion to other materials and have good resistance to water, alkali and solvents. They are therefore ideally suited for use in preparing flexible resistant coatings for materials, such as cellophane, vinyl polymer films, rubbers, metals, wood and the like.

The polyepoxides used in the process of the invention comprise those compounds possessing a plurality of 1,2-epoxy groups (i.e.,

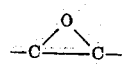

groups). These polyether polyepoxides may be aliphatic, cycloaliphatic, aromatic or heterocyclic and may be substituted if desired with substituents, such as halogen atoms, hydroxyl groups, ether radicals, and the like.

For clarity, many of the polyepoxides and particularly those of the polymeric type will be described throughout the specification and claims in terms of an epoxy equivalency. The term "epoxy equivalency" as used herein refers to the average number of epoxy groups contained in the average molecule. This value is obtained by dividing the average molecular weight of the polyepoxide by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxide material consists of a single compound and all of the epoxy groups are intact, the epoxy equivalency will be integers, such as 2,3,4, and the like. However, in the case of polymeric-type polyether polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Polyepoxides to be used in the process of the invention may be exemplified by butadiene diepoxide, vinyl cyclohexane diepoxide, epoxidized di and triglycerides, 1,4-bis(2,3 - epoxypropoxy)benzene, 1,3 - bis(2,3-epoxypropoxy)benzene, 4,4'-bis(2,3 - epoxypropoxy)diphenyl ether, 1,3-bis(2,3-epoxypropoxy)octane, 1,4-bis(2,3-epoxypropoxy)cyclohexane, 4,4'-bis(2-hydroxy-3,4-epoxybutoxy)diphenyldimethylmethane, 1,3 - bis(4,5 - epoxypentoxy)5 - chlorobenzene, 1,4 - bis(3,4 - epoxybutoxy) 2-chlorocyclohexane, ethylene glycol, diglycidyl ether, resorcinol diglycidyl ether, and 1,2,3,4-tetra(2-hydroxy-3,4-epoxybutoxy)butane.

Other examples include the glycidyl polyethers of polyhydric phenols obtained by reacting the polyhydric phenols with epichlorohydrin or dichlorohydrin in an alkaline medium. Polyhydric phenols that may be used for this purpose may be exemplified by 2,2-bis(4-hydroxyphenyl) propane (bis-phenol-A), resorcinol, catechol, hydroquinone, methyl resorcinol, 2,2-bis(4-hydroxyphenyl) butane, 4,4'-dihydroxybenzophenone, bis(4-hydroxyphenol) ethane and 1,4-dihydronaphthalene as well as more complex polyhydric phenols such as pyrogallol, phloroglucinol and novolac resins from condensation of a phenol with an aldehyde in the presence of an acidic condensation catalyst. Preparation of glycidyl polyethers of novolac resin is described in Example 27 of German Patent No. 676,117.

The condensates prepared from the polyhydric phenols and the epichlorohydrin or dichlorohydrin may be represented by the formula

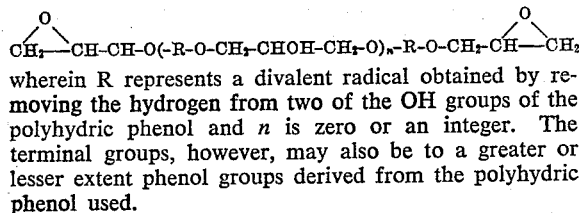

wherein R represents a divalent radical obtained by removing the hydrogen from two of the OH groups of the polyhydric phenol and $n$ is zero or an integer. The terminal groups, however, may also be to a greater or lesser extent phenol groups derived from the polyhydric phenol used.

Particularly preferred polyethers used in the invention are prepared from 2,2-bis(4-hydroxyphenol)propane. They contain a chain of alternating glyceryl and 2,2-bis(4-hydroxyphenylene) propane radicals separating by intervening etheral oxygen atoms and have a 1,2-epoxy equivalency between 1.0 and 2.0. Very suitable glycidyl polyethers of 2,2-bis(4-hydroxyphenyl) propane have a molecular weight of about 350 to 400 as is the case when $n$ values up to 1,3 in the above-described structural formula.

The glycidyl polyethers will be better understood from consideration of the following described preparations and the properties of the products. The parts are by weight.

POLYETHER A

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 342 (measured ebullioscopically in ethylene dichloride). The product had an epoxy value of 0.528 eq./100 g.

POLYETHER B

A solution consisting of 11.7 parts of water, 1.22 parts of sodium hydroxide, and 13.38 parts of 2,2-bis(4-hydroxyphenyl) propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes" time a solution consisting of 5.62 parts of sodium hydroxide in 11.7 parts of water. This caused the temperature to rise to 63° C. Washing with water at 20° C. to 30° C. temperatures started 30 minutes later and continued for 4½ hours. The product was dried by heating to a final temperature of 140° C. in 80 minutes, and cooled rapidly. At room temperature, the product was an extremely viscous semi-solid having a melting point of 25° C. by Durrans' Mercury Method and a molecular weight of 470. The product had an epoxy value of 0.40 eq./100 g.

POLYETHER C

About 228 parts of 2,2-bis(4-hydroxyphenyl)propane and 84 parts sodium hydroxide as a 10% aqueous solution were combined and heated to about 45° C. whereupon 176 parts of epichlorohydrin was added rapidly. The temperature increased and remained at about 95° for 80 minutes. The mixture separated into a two-phase system and the aqueous layer is drawn off. The resinous layer that remained is washed with hot water and then drained and dried at 130° C. The Durrans' Mercury Method melting point of the resulting product is 52° C. and the molecular weight is about 710. The product has an epoxy value of 0.27 eq./100 g., the total amount of the cross-linking agent and the organic compound containing the monofunctional group being sufficient to furnish at least .9 equivalent for every epoxy equivalent and the amount of the cross-linking agent being not more than 70% of the said mixture.

Other polyepoxides comprise the polyglycidyl ethers of polyhydric alcohols obtained by reacting the polyhydric alcohol with epichlorohydrin, preferably in the presence of 0.1% to 5% by weight of an acid-acting compound, such as boron trifluoride or hydrofluoric acid and subsequently treating the resulting product with an alkaline component to effect dehydrochlorination of the product. Polyhydric alcohols that may be used for this purpose include among others glycerol, propylene glycol, ethylene glycol, diethylene glycol, butylene glycol, hexanetriol, sorbitol, mannitol, pentaerythritol, polyallyl alcohol, polyvinyl alcohol, sorbitol, mannitol, inositol, trimethylolpropane, bis(4-hydroxycyclohexyl)dimethylmethane, 1,4-dimethylolbenzene, 4,4'-dimethyloldiphenyl, dimethylol toluenes, and the like, diglycerol, triglycerol, dipentaerythritol, tripentaerythritol, dimethylolanisoles, betahydroxyethyl ethers of polyhydric alcohols, such as diethylene glycol, polyethylene glycols, bi(beta hydroxyethyl ether) of hydroquinone, bis(beta hydroxyethyl ether) of bisphenol, beta hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxydiethyl sulfide, 2,2'-3,3'-tetrahydroxy dipropyl sulfide, dextrose, fructose, maltose and glyceraldehyde.

The above reaction is preferably effected by heating the polyhydric alcohol and epichlorohydrin at about 50° C. to 125° C. in proportions such that there is about one mole of epichlorohydrin for every equivalent of hydroxyl group in the polyhydric alcohol. The resulting chlorohydrin is then dehydrochlorinated by heating at about 50° C. to 125° C. with a small, e.g., 10% stoichiometrical excess of a base, such as sodium aluminate.

The preparation of one of these polyglycidyl ethers of polyhydric alcohols may be illustrated by the following examples showing the preparation of a glycidyl polyether of glycerol.

POLYETHER D

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substance removed by distillation to a temperature of about 150° C. at 20 mm. pressure. The polyglycidyl ether, in amount of 261 parts, was a pale yellow, viscous liquid. It had an epoxide value of 0.671 equivalent per 100 grams and the molecular weight was 325 as measured ebullioscopically in dioxane solution. The epoxy equivalency of this product was 2.13.

Other polyepoxides include the polyepoxypolyhydroxy polyethers obtained by reacting, preferably in an alkaline medium, a polyhydric alcohol or polyhydric phenol with a polyepoxide, such as the reaction product of a glycidyl ether of a polyhydric phenol with the same or different polyhydric phenol, the reaction product of glycerol and bis(2,3-epoxypropyl)ether, the reaction product of sorbitol and bis(2,3-epoxy-2-methylpropyl) ether, the reaction product of pentaerythritol and 1,2-epoxy-4,5-epoxypentane, and the reaction products of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

The glycidyl polyethers referred to above are also referred to as "ethoxyline" resins. See Chemical Week, vol. 69, page 27, for September 8, 1951.

The organic epoxy cross-linking agents used in the process of the invention are those having at least three and preferably four or more active hydrogen. These materials include, among others, polyamines, polyamides containing plurality of free amino groups and/or carboxyl groups, such as, for example, those disclosed in U.S. 2,450,940 and U.S. 2,695,908, polycarboxylic acids, polyesters and polyamides containing free carboxyl groups, adducts of polyepoxides and polyamines such as disclosed in U.S. 2,651,589, polymercaptans, polythiopolymercaptans as disclosed in adducts of polyepoxides and polymercaptans and hydrogen sulfide, such as those described in Shokal—U.S. 2,633,458 and copending application Shokal et al. Serial No. 256,964, filed November 17, 1951, polyaldehydes and the like. Specific examples of these materials include, among others, diethylene triamine, triethylene triamine, meta-phenylene diamine, 1,4-diaminocyclohexane, 1,3-diaminopropane, 1,6-diaminohexane, 1,8-diaminooctane, polyamides of dimer acid and diethylene triamine containing free amino groups, polyamide of dimer acid and triethylene triamine containing free amino groups, polyesters of 1,2,4-butanetricarboxylate and ethylene glycols containing free carboxyl groups, 1,5,8-octanedithiol, 1,8,10-dodecanetrithiol, adduct of Polyether A and 1,8,10-dodecanetrithiol containing free marcapto groups, adduct of Thiokol LP-2 and Polyether A containing free mercapto groups, and the like.

Particularly preferred cross-linking agents to be utilized are the aliphatic and aromatic amines containing from 2 to 6 amino or substituted amino groups, amino-containing polyamides of dicarboxylic acids and aliphatic polyamines, aliphatic and aromatic tricarboxylic acids containing no more than 12 carbon atoms, polyesters containing free carboxyl groups prepared from tricarboxylic acids and aliphatic polyhydric alcohols, aliphatic, cycloaliphatic and aromatic polymercaptans and adducts of polyepoxides as described hereinabove and these aliphatic, cycloaliphatic and aromatic polymercaptans as well as polythiopolymercaptans as described in copending application Ser. No. 256,964 noted above.

Of special interest, particularly because of the high degree of age resistance to embrittlement obtained therewith, are the aliphatic and aromatic amines containing from 2 to 6 amino or substituted amino groups and not more than 12 carbon atoms, and amino-containing polyamides prepared from aliphatic and aromatic dicarboxylic acids containing no more than 12 carbon atoms and the above-described aliphatic and aromatic amines containing from 2 to 6 amino groups.

The other component to be added to the reaction mixture comprises an organic compound having a single functional group reactive with epoxy groups and containing an open chain of at least 12 atoms in a chain structure. The atoms can be C, S, O, P and Si with preference to those chains that are predominantly made of carbon atoms. Functional groups reactive with epoxy groups may be exemplified by amine and substituted amine groups, —SH, —COOH, SO$_3$H, and related groups. The open chain of at least 12 atoms may be attached directly to those groups or attached thereto through other intervening groups. Examples of these organic compounds that may be used in the process include, among others, octadecylamine, hexadecylamine, eicosanylamine, N-heptyl dodecylamine, N-allyl octadecylamine, decosanylamine, hexacosanylamine N-propyl octadecenylamine, stearic acid, oleic acid, eciosanoic acid, hexacosanoic acid, dodecanoic acid, pentadecanethiol, 3-hexadecene-16-thiol, octadecanethiol, amino (hexapropylene oxide), lauryl 1-amino, 3-propyl sulfide; decyl, 1-aminomethyl, 2-hydroxy 3-propyl sulfone, eicosanethiol, octodecanesulfonic acid, pentadecanesulfonic acid, eicosanesulfonic acid, and hexacasanethiol.

Especially preferred monofunctional compounds to be used in the process comprise the organic compounds containing an open chain of from 16 to 24 aliphatic carbon atoms and having a single functional group which is a member of the group consisting of —COOH, —SO$_3$H, —NH$_2$, and

wherein R is an aliphatic hydrocarbon radical containing up to 18 carbon atoms, such as, for example, oleic acid, stearic acid, octadecylamine, hexadecylamine, eicosanylamine, tricosanoic acid, eicosanethiol, octadecanethiol, hexanesulfonic acid, eicosanesulfonic acid, N-allyl octadecylamine, N-isopropyl hexadecylamine, N-octadecyl octadecylamine and the like, and mixtures thereof. Coming under special consideration are the organic compounds of the group consisting of R$_1$COOH, R$_1$SO$_3$H, R$_1$NH$_2$ and

wherein R$_1$ is an aliphatic hydrocarbon containing 12 to 24 carbon atoms and R is a hydrocarbon radical containing up to 18 carbon atoms.

In order to obtain products having the above-noted superior properties, it is necessary that an important detail be observed, namely, that the above components be combined in special ratios of proportions. The special properties are obtained only when the total amount of epoxy cross-linking agent and organic compound having the monofunctional group and at least 12 atoms in a chain is equal to at least .9 equivalent for every epoxy equivalent in the polyepoxide, and not more than 70% by weight of the equivalent mixture of cross-linking agent and long chain monofunctional compound being the cross-linking agent. By equivalent of curing agent and long chain derivatives is meant a hydrogen capable of opening up an epoxy group. Preferably, the total amount of cross-linking agent and organic compound having the monofunctional group with at least 12 atoms in a chain equal to from 1 to 1.5 equivalents for every epoxy equivalent in the polyepoxide and 20% to 70% of the mixture of cross-linking agent and monofunctional compound being the cross-linking agent. In those instances where the product is to be used in castings, the mixture of cross-linking agent and monofunctional compound is preferably such that 20% to 50% of the mixture is the cross-linking agent, and in case the product is to be used in making surface coatings, from 40% to 60% of the mixture is preferably the cross-linking agent.

The reaction is accomplished by mixing the above described three components together and heating. The exact temperature selected depending on the type of cross-linking agent utilized. In general, temperatures employed will vary from about 30° C. to 200° C. With the very active curing agents, the temperature may be relatively low, e.g., between about 30° C. to 50° C. while with the less active cross-linking agents, higher temperatures, such as of the order of 50° C. to 200° C., may be needed.

One important application of the invention is in the preparation of flexible coatings and adhesives. In this case, the above components are combined together with a suitable diluent or solvent and the mixture then applied to the desired surface and heat applied to effect the cure.

Another important application is in the preparation of moldings and castings. In this case the above components are combined and the mixture placed in a mold or casting and allowed to set. Heat is then applied to hasten cure as noted above.

The process of the invention may also be used to advantage in the manufacture of laminated materials. The products of the invention have very good adhesive power, so they are particularly suited for this purpose. In this case, the above components are combined together with a suitable diluent or solvent, if desired, and the mixture then applied to the surfaces which are to be utilized in making the laminate. Heat and pressure are then applied as needed to effect the cure.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

The impact resistance reported in the examples was determined by striking a sheet of the casting approximately 2 x 7 x 5/32 inches sharply against the edge of a wooden table top. If after 5 sharp blows, the casting did not shatter or crack it was regarded as having good impact resistance.

The flexibility of the castings were rated as follows:

(1) Semi-flexible to slightly flexible
(2) Slightly flexible to moderately flexible
(3) Moderately flexible to very flexible
(4) Very flexible to extremely flexible The soluble pourable polyamide of dimerized soybean oil acids and diethylene triamine referred to in the examples is General Mills Resin 115 having following properties: Gardner-Holdt viscosity of about 10, mol wt. of 1307 and 10.7% nitrogen.

*Example I*

(A) This part of the example illustrates the preparation of a flexible casting from Polyether A, octadecylamine and a soluble pourable polyamide of dimerized soybean oil acids and diethylene triamine.

100 parts of Polyether A (.528 eq.) was combined with 42.4 parts (.315 eq.) of octadecylamine and 40 parts (.212 eq.) of the soluble polyamide. This mixture was blended with stirring at 80° C. for a few minutes and then cured at 100° C. for three hours. At the end of that time, the product was a hard clear homogeneous casting. The casting had a flexibility rating of 3 and did not shatter after five strikes against the wooden table top.

A .003" thick cast film was prepared by spreading a solution of the above mixture on a tin plate and curing 2 hours at 100° C. and stripping with mercury. It had a tensile strength of 2143 p.s.i., an elongation of 58.6% and excellent resistance to boiling water. After aging at 65° C. for 60 hours, the film still possessed 90% of its original flexibility and impact resistance.

Solutions of the above mixture were also applied to cellophane, rubber, vinylidene chloride copolymer films and wood then cured at 100° C. The films had good adhesion to these materials and displayed the same excellent flexibility and impact resistance. The cellophane coated with the mixture, for example, could be crushed and folded without any breaking of the coating and after boiling in water 10 minutes, it still had excellent optical clarity.

(B) This part of the example illustrates the inferior products obtained when the cross-linking agent and long chain derivative are used by themselves with the polyether polyepoxide or are not used in the required proportions.

100 parts of Polyether A (.528 eq.) was combined with 71 parts (.528 eq.) of octadecylamine and the mixture heated to 100° C. for three hours. The resulting product was extremely soft and had poor strength. The product shattered when exposed to the impact test.

100 parts of Polyether A (.528 eq.) was combined with .528 equivalent of the above-noted soluble pourable polyamide of dimerized soybean oil acids and diethylene triamine and the mixture heated to 100° C. for three hours. The resulting product was hard and had poor impact resistance as it cracked when exposed to the above-noted impact test.

*Example II*

Example I was repeated with the exception that the amount of the polyamide employed was 35 parts (.186 eq.) and the octadecylamine was 53 parts (.393 eq.). In this case the casting had a flexibility of 3 and good impact resistance. This product had an elongation of 75% and excellent resistance to boiling water.

Solutions of the above mixture were also applied to cellophane, rubber, vinylidene chloride copolymer films and wood and then cured at 100° C. The films had good adhesion to these materials and displayed the same excellent flexibility and impact resistance. The cellophane coated with the material, for example, could be crushed and folded without any breaking of the coating.

*Example III*

This example illustrates the preparation of flexible castings from Polyether A, oleic acid and a soluble pourable polyamide of dimerized soybean oil acids and diethylene triamine.

100 parts (.528 eq.) of Polyether A was combined with 50 (.266 eq.) of the polyamide and 74 parts (.262 eq.) of oleic acid and the mixture heated at 100° C. for three hours. At the end of that time, the product was a clear homogeneous casting. The casting had a flexibility rating of 4 and good impact resistance. The product was aged for 20 days at 65° C., and at the end of that time still possessed excellent flexibility and impact resistance.

Castings having related properties are also obtained by changing the amount of the polyamide to 45 parts and the amount of the oleic acid to 81.9 parts. Castings having related properties are also obtained by replacing the oleic acid with equivalent amounts of each of the following: Stearic acid, eicasonoic acid and hexacosonoic acid.

*Example IV*

This example illustrates the preparation of flexible castings from Polyether A, octadecylamine, octadecylthiol and a soluble pourable polyamide of dimerized soybean oil acids and diethylene triamine.

100 parts (.528 eq.) of Polyether A was combined with 39.2 parts (.292 eq.) of octadecylamine, 35 parts (.186 eq.) of the polyamide of dimer acid and diethylene triamine and 13 parts (.05 eq.) of octadecylthiol. This mixture was then heated at 100° C. for three hours. At the end of that time, the product was a clear homogeneous casting. The product had a flexibility of 4 and had good impact resistance. The product was aged for 20 days at 65° C., and at the end of that time still possessed excellent flexibility and impact resistance.

Related results are obtained by replacing the octadecylithiol with equivalent amounts of hexacosanylthiol and eicosanylthiol.

Example V

This example illustrates the preparation of a flexible casting from Polyether A, octadecylamine and hexamethylene diamine.

100 parts (.528 eq.) of Polyether A was combined with 49.5 parts (.368 eq.) of octadecylamine and 4.7 (1.6 eq.) of hexamethylene diamine. This mixture was heated at 100° C. for three hours. At the end of that time, the product was a clear homogeneous casting. The casting had flexibility rating of 3–4 and did not shatter after 5 strokes. The product was aged for 20 days at 65° C. and at the end of that time still possessed excellent flexibility and impact resistance.

Example VI

This example illustrates the preparation of a flexible casting from Polyether A, octadecylamine and diethylene triamine.

100 parts (.528 eq.) of Polyether A was combined with 49.5 parts (.368 eq.) of octadecylamine and 3.3 parts (.16 eq.) of diethylene triamine. This mixture was heated at 100° C. for three hours and at the end of that time had set to a clear homogeneous product. The product had flexibility rating of 3 and good impact resistance. After aging for 20 days at 65° C., the product still possessed good flexibility and impact resistance.

Related results are obtained by replacing the octadecylamine with equivalent amounts of each of the following: eicasanylamine, hexodecylamine and hexacosanylamine.

Example VII

This example illustrates the preparation of a flexible casting from Polyether A, octadecylamine, dodecanethiol and a soluble pourable polyamide of dimerized soybean oil acids and diethylene triamine.

100 parts of Polyether A was mixed with 39.2 parts (.292 eq.) of octadecylamine, 35 parts of the soluble polyamide (.186 eq.) and 10 parts (.05 eq.) of dodecanethiol. This mixture was heated at 100° C. for three hours. At the end of that time, the product was a clear homogeneous casting. The casting had a flexibility rating of 4 and good impact resistance. The product after aging for 20 days at 65° C. still possessed good flexibility and impact resistance.

Example VIII

This example illustrates the preparation of flexible castings by reacting Polyether A with dodecanethiol and the soluble pourable polyamide of dimerized soybean oil acids and diethylene triamine.

100 parts of Polyether A was combined with 35 parts (.186 eq.) of the soluble polyamide and 68.8 parts (.342 eq.) of dodecanethiol. This mixture was heated at 100° C. for three hours. The resulting casting had a flexibility of 4 and did not shatter in the impact test. The product after aging for 20 days at 65° C. still possessed good flexibility and impact resistance.

Example IX

This example illustrates the preparation of a flexible casting from Polyether A, octadecanesulfonic acid and the diethylene triamine.

100 parts of Polyether A was combined with .21 equivalent octadecanesulfonic acid and .318 equivalent of diethylene triamine. This mixture is heated at 100° C. for three hours. The resulting casting has excellent flexibility and good impact resistance which are not lost after aging for 20 days at 65° C.

Products having related results are obtained by replacing the octadecanesulfonic acid in the above process with equivalent amounts of each of the following: dodecanesulfonic acid and hexadecanesulfonic acid.

Example X

This example illustrates the preparation of a flexible casting from Polyether B, octadecylamine and triethylene tetramine.

100 parts of Polyether B (.40 eq.) is combined with .250 equivalent of octadecylamine and .150 equivalent of triethylene tetraamine and the mixture heated at 100° C. for three hours. The resulting casting is a clear homogeneous product having good flexibility and impact resistance which are not lost after aging for 20 days.

Related products are obtained by replacing the Polyether B in the above-described process with equivalent amounts of each of the following: Polyether C and Polyether D.

Example XI

This example illustrates the preparation of a flexible casting from Polyether A, octadecylamine and a polyepoxide-diethylene triamine adduct prepared as shown in Example XII of U.S. 2,651,589.

100 parts of Polyether A is combined with .215 equivalent of octadecylamine and .313 equivalent of the Polyether A-diethylene triamine adduct and the mixture heated at 100° C. for three hours. The resulting casting is a clear homogeneous product having good flexibility and impact resistance which are not lost after aging.

Example XII

This example illustrates the preparation of a flexible casting from Polyether A, diheptylamine and diethylene triamine.

100 parts of Polyether A is combined with 45 parts (.21 eq.) of diheptylamine and 6.4 parts (.318) of diethylene triamine and the mixture prereacted for ½ hour at 80° C. to get homogeneous then heated for three hours in the mold. The resulting casting is a clear homogeneous product having good flexibility and impact resistance which are not lost after aging from 20 days at 65° C.

I claim as my invention:

1. A process for preparing flexible resinified products from glycidyl polyethers of polyhydric compounds of the group consisting of polyhydric phenols and polyhydric alcohols which comprises adding a cross-linking agent having at least three active hydrogens and a long-chain monofunctional organic compound having at least 12 carbon atoms, and possessing a single functional group reactive with epoxy groups and selected from the group consisting of —COOH, —SH, —SO₃H, —NH₂,

wherein R is an alkyl radical to the glycidyl polyether and heating and reacting the combined mixture at a temperature between 30° C. and 200° C., the total amount of cross-linking agent plus long-chain monofunctional compound being sufficient to furnish from .9 to 1.5 equivalents of groups reactive with an epoxy group for every epoxy equivalent and the amount of the cross-linking agent being from 20% to 70% of the mixture of cross-linking agent and monofunctional agent.

2. A process as in claim 1 wherein the cross-linking agent possessing at least three active hydrogen is an aliphatic amine containing from 2 to 6 amino groups.

3. A process as in claim 1 wherein the long chain monofunctional compound is a monocarboxylic acid containing from 12 to 26 carbon atoms.

4. A process as in claim 1 wherein the long chain monofunctional compound is an aliphatic monosulfonic acid containing from 16 to 26 carbon atoms.

5. A process as in claim 1 wherein the long chain monofunctional compound is a monothiol containing from 12 to 26 carbon atoms.

6. A process as in claim 1 wherein the polyepoxide is a glycidyl polyether of 2,2-bis(4-hydroxyphenyl) propane having an epoxy equivalency between 1.0 and 2.5.

7. A process for preparing flexible resinified product from a glycidyl polyether of a polyhydric phenol which comprises adding to the glycidyl polyether a cross-linking agent containing at least three active hydrogens and a monofunctional long-chain organic compound having a chain of at least 12 carbon atoms and possessing a functional group selected from the group consisting of —COOH, —SH, —SO$_3$H, —NH$_2$ and $$-\underset{\text{H}}{\text{N}}\text{R}$$

wherein R is an alkyl radical and heating and reacting components at a temperature of 30° C. and 200° C., the total amount of the cross-linking agent plus the long-chain monofunctional organic compound being sufficient to furnish from 1.0 to 1.5 equivalents of groups reactive with groups for every epoxy equivalents and the amount of the cross-linking agent being from 20% to 70% of the mixture of cross-linking agent and monofunctional agent.

8. A process as in claim 7 wherein the long chain monofunctional organic compound is oleic acid.

9. A process as in claim 7 wherein the long chain monofunctional organic compound is octadecylamine.

10. A process as in claim 7 wherein the long chain monofunctional organic compound is octadecanethiol.

11. A process as in claim 7 wherein the long chain derivative is a mixture of C$_{14}$ to C$_{18}$ N-aliphatic amines.

References Cited in the file of this patent

UNITED STATES PATENTS

| | | |
|---|---|---|
| 2,627,483 | Dowd | Feb. 3, 1953 |
| 2,637,716 | Ott | May 5, 1953 |
| 2,681,901 | Wiles et al. | June 22, 1954 |
| 2,712,535 | Fisch | July 5, 1955 |
| 2,731,444 | Greenlee | Jan. 17, 1956 |
| 2,801,229 | De Hoff | July 30, 1957 |

OTHER REFERENCES

Dearborn et al.: Industrial & Engineering Chem., volume 45, No. 12, December 1953, pp. 2715–2721. (Copy in Scientific Lib.)

Jorszok et al.: India Rubber World, volume 150, No. 1, April 1954, pp. 66–69. (Copy in Scientific Library.)